(12) United States Patent
Palmowski et al.

(10) Patent No.: US 10,605,955 B2
(45) Date of Patent: Mar. 31, 2020

(54) MULTI-STEP SUBSIDENCE INVERSION FOR MODELING LITHOSPHERIC LAYER THICKNESS THROUGH GEOLOGICAL TIME

(71) Applicant: Schlumberger Technology Corporation, Sugar Land, TX (US)

(72) Inventors: Daniel Bruno Palmowski, Wurselen (DE); Thomas Fuchs, Herzogenrath (DE); Martin Rohde, Aachen (DE); Thomas Hantschel, Aachen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 439 days.

(21) Appl. No.: 15/153,245

(22) Filed: May 12, 2016

(65) Prior Publication Data

US 2017/0329046 A1 Nov. 16, 2017

(51) Int. Cl.
G01V 99/00 (2009.01)

(52) U.S. Cl.
CPC .................................. *G01V 99/005* (2013.01)

(58) Field of Classification Search
CPC ..................................................... G01V 99/005
See application file for complete search history.

(56) References Cited

U.S. PATENT DOCUMENTS

| | | | | |
|---|---|---|---|---|
| 2013/0132047 A1* | 5/2013 | Granjeon | ................ | G06F 17/10 703/2 |
| 2014/0350905 A1* | 11/2014 | Wienecke | .............. | G01V 11/00 703/2 |

OTHER PUBLICATIONS

Lin Changsong et al, Quantitative Modelling of Multiphase Lithospheric Stretching and Deep Thermal History of Some Tertiary Rift Basins in Eastern China Vot 75No. 3 Acta Geologica Sinica Sep. 2002 (Year: 2002).*

Charlotte E. Keen and Sonya A Dehler, Stretching and Subsidence: RIFJ1NG of CONnJGATE Margins in TIIB North Atlantic Region, Tectonics, Vol. 12, No. 5, pp. 1209-1229, Oct. 1993 (Year: 1993).*

Laurent Michon and Olivier Merle, Mode of lithospheric extension: Conceptual models from analogue modeling Tectonics, vol. 22, No. 4, 1028, doi:10.1029/2002TC001435, 2003 (Year: 2003).*

Daniel B. Palmowski et al, A New Look at Inverting Subsidence to Heat Flow in Rift-Related Basins—Deconvolution of Processes and Phases, Adapted from oral presentation given at AAPG 2017 Annual Convention and Exhibition, Houston, Texas, United States, Apr. 2-5, 2017 (Year: 2017).*

Zhongxian Zhao, The dynamic mechanism of post-rift accelerated subsidence in Qiongdongnan Basin, northern South China Sea, Mar Geophys Res (2013) 34:295-308 (Year: 2013).*

Van Wees, J. D., F. Van Bergen, P. David, M. Nepveu, F. Beekman, S. A. P. L. Cloetingh, and D. Bonte. "Probabilistic tectonic heat flow modeling for basin maturation: Assessment method and applications." Marine and Petroleum Geology 26, No. 4 (2009): 536-551. (Year: 2009).*

(Continued)

*Primary Examiner* — Rehana Perveen
*Assistant Examiner* — Chuen-Meei Gan
(74) *Attorney, Agent, or Firm* — Michael Guthrie

(57) ABSTRACT

A method, apparatus, and program product utilize a multi-step subsidence inversion to model lithospheric layer thickness through geological time for a rift basin in a subsurface formation.

17 Claims, 9 Drawing Sheets

(56) References Cited

OTHER PUBLICATIONS

Daniel B. Palmowski, Thomas Fuchs, and Thomas Hantschel, A New Look at Inverting Subsidence to Heat Flow in Rift-Related Basins—Deconvolution of Processes and Phases, oral presentation given at AAPG 2017 Annual Convention and Exhibition, Houston, Texas, United States, Apr. 2-5, 2017 (Year: 2017).*

Changsong, et al., "Quantitative modelling of multiphase lithospheric stretching and deep thermal history of some Tertiary rift basins in eastern China," Acta Geologica Sinica (English edition), Sep. 2002, vol. 76, No. 3, pp. 324-330.

Clift, et al., "Preferential mantle lithospheric extension under the South China margin," Marine and Petroleum Geology, 2001, vol. 18, No. 8, pp. 929-945.

Dong, et al., "Tectonic evolution and dynamics of deepwater area of Pearl River Mouth basin, northern South China Sea," Journal of Earth Science, Feb. 2009, vol. 20, No. 1, pp. 147-159.

Jarvis, et al, "Sedimentary basin formation with finite extension rates," Earth and Planetary Science Letters, vol. 48, Issue 1, 1980, pp. 42-52.

Jolivet, et al., "From mantle to crust: Stretching the Mediterranean," Earth and Planetary Science letters, Jul. 2009, vol. 285, No. 1, pp. 198-209.

McKenzie, "Some remarks on the development of sedimentary basins," Earth and Planetary Science Letters, vol. 40, Issue 1, 1978, pp. 25-32.

White et al., "Formation of the "steer's head" geometry of sedimentary basins by differential stretching of the crust and mantle," Geology, vol. 16, No. 3, 1988, pp. 250-253.

International Search Report and Written Opinion for the equivalent International patent application PCT/US2017/026737 dated Jul. 13, 2017.

International Preliminary Report on Patentability for the equivalent International patent application PCT/US2017/028737 dated Nov. 22, 2018.

Baur, et al., "Basin and Petroleum Systems Modeling at the Jeanne d'Arc and Carson Basin offshore Newfoundland, Canada," CSEG Recorder, Sep. 1, 2009, pp. 28-36.

Baur, et al., "Basin modeling meets rift analysis a numberical modeling study from the Jeanne d'Arc basin, offshore Newfoundland, Canada," Marine and Petroleum Geology, Butterworth Scientific, Guidford, GB, vol. 27, No. 3, Mar. 1, 2010, pp. 585-599.

Van Wees, et al., "Probabilistic tectonic heat flow modeling for basin maturation: Assessment method and applications," Marine and Petroleum Geology, Butterworth Scientific, Guildford, GB, vol. 26, No. 4, Apr. 1, 2009, pp. 536-551.

Extended Search Report for the counterpart European patent application 17796529.0 dated Dec. 10, 2019.

* cited by examiner

MULTI-STEP SUBSIDENCE INVERSION FOR MODELING LITHOSPHERIC LAYER THICKNESS THROUGH GEOLOGICAL TIME

BACKGROUND

Petroleum systems modeling and simulation are commonly used in the oil & gas industry to model the structure and/or properties of subsurface formations, e.g., of the type containing recoverable hydrocarbons. Petroleum systems modeling and simulation may be used during various phases of exploration and production, including, for example, to attempt to predict the location, quantity and/or value of recoverable hydrocarbons, to plan the development of wells for cost-effectively extracting hydrocarbons from the subsurface formation, and to guide future and/or ongoing production and development decisions.

Petroleum systems modeling is a particular type of subsurface modeling that attempts to model, amongst others, the petroleum generation potential of a sedimentary basin, generally by modeling geologic, thermal and fluid-flow processes in and around the sedimentary basin over a time period on the order of millions of years. A sedimentary basin is understood to be a region of the Earth of long-term subsidence (i.e., downward shifting of the Earth) creating the conditions for infilling by sediments, and understanding the evolution of such basins has been found to provide useful insight for locating potential hydrocarbon reserves. Sedimentary basins may form in response to various geological processes. For example, one type of sedimentary basin, referred to a rift basin, generally forms as a result of continental rifting, and is generally characterized as an elongate crustal depression bounded on one or both sides by basement-involved normal faults.

One particular uncertainty in petroleum system modeling is the amount of heat that has entered sedimentary basins from below, also known as basal heat flow. In rift basins, for example, the lithospheric layer thicknesses of the outer earth can be a notable factor when defining basal heat flow. Conventional approaches used to generate thickness variations apply an isostatic principle to a stretching model in order to invert the observed subsidence into a thickness variation of the lithospheric layers. However, it has been found that the behavior described in these models may not describe the stretching within the upper mantle in a geologically reasonable way.

With respect to rift basins, for example, subsidence is generally understood to occur in two phases. First, during a syn-rift phase, the lithospheric layers are stretched and thinned. Second, during a post-rift phase, the lithospheric or upper mantle cools back to a roughly pre-rift thickness. Conventional modeling approaches attempt to calculate lithospheric layer thicknesses through the use of different stretching factors for the crust and upper mantle lithospheric layers in a single fitting routine against the basin's tectonic subsidence curve; however, it has been found that such approaches have failed to accurately describe the evolution of a number of actual rift basins, in part due to a failure to consider the different processes in the lithospheric layers.

SUMMARY

The embodiments disclosed herein provide a method, apparatus, and program product that utilize a multi-step subsidence inversion to model lithospheric layer thickness through geological time. In particular, in some embodiments of the invention, a subsurface process may be modeled by modeling upper mantle stretching for a rift basin in a subsurface formation during a syn-rift phase and based upon subsidence during a post-rift phase and thermal thickening of the upper mantle lithospheric layer of the subsurface formation during post-rift subsidence, and modeling crustal stretching for the rift basin during the syn-rift phase based upon syn-rift subsidence and the modeled upper mantle stretching.

Some embodiments further include modeling the thermal thickening of the upper mantle lithospheric layer of the subsurface formation during the post-rift subsidence, and some embodiments further include modeling an evolution of thickness variations of the upper mantle and crust lithospheric layers through geological time based at least in part upon the modeled upper mantle stretching and modeled crustal stretching for the rift basin. In addition, some embodiments further include modeling basal heat flow in the subsurface formation through geological time based upon the modeled evolution of thickness variations, while some embodiments further include performing an oilfield operation based upon the modeled evolution of thickness variations and/or the modeled basal heat flow in the subsurface formation. In addition, some embodiments further include causing a graphical depiction of the modeled evolution of thickness variations and/or the modeled basal heat flow to be displayed on a computer display.

In some embodiments, modeling the upper mantle stretching includes generating an upper mantle stretching factor, and modeling the crustal stretching includes generating a crust stretching factor. Further, in some embodiments, the upper mantle stretching factor includes an upper mantle stretching factor map, and the crust stretching factor includes a crust stretching factor map, and in some embodiments, modeling the crustal stretching includes modeling the crustal stretching using the generated upper mantle stretching factor. In some embodiments, modeling the upper mantle stretching includes inverting post-rift subsidence, and modeling the crustal stretching includes inverting syn-rift subsidence, while in some embodiments, modeling the upper mantle stretching includes fitting a post-rift subsidence curve for the rift basin by varying the upper mantle stretching factor, and modeling the crustal stretching includes fitting a syn-rift subsidence curve for the rift basin by varying the crust stretching factor and using the generated upper mantle stretching factor.

Some embodiments additionally include generating a tectonic subsidence curve for the rift basin including the syn-rift and post-rift subsidence curves, and in some embodiments, generating the tectonic subsidence curve includes removing non-stretching effects from a total subsidence curve for the rift basin. Some embodiments also include generating the total subsidence curve for the rift basin based at least in part on sediment fill, current formation data, paleo-geometric data and stratigraphic data. Further, some embodiments additionally include causing a graphical depiction of the tectonic subsidence curve to be displayed on a computer display.

Some embodiments may also include an apparatus including at least one processing unit and program code configured upon execution by the at least one processing unit to model a subsurface process in any of the manners discussed herein. Some embodiments may also include a program product including a computer readable medium and program code stored on the computer readable medium and configured upon execution by at least one processing unit to model a subsurface process in any of the manners discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
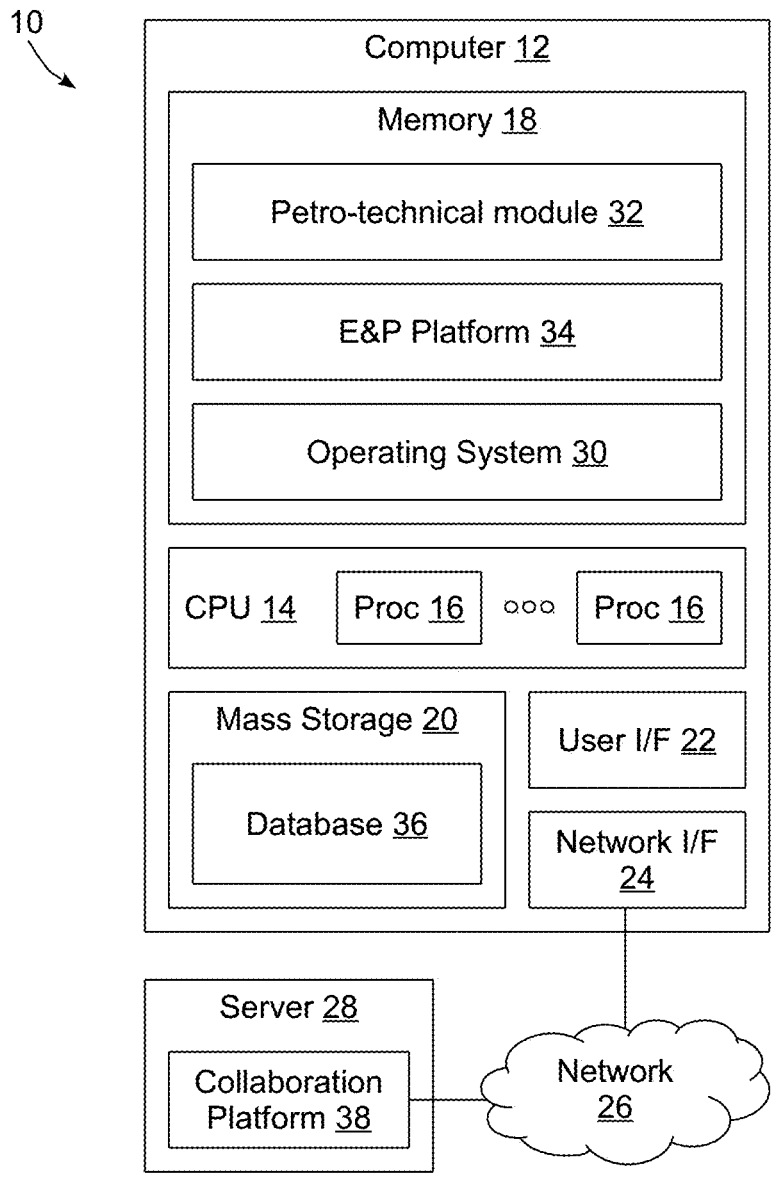
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
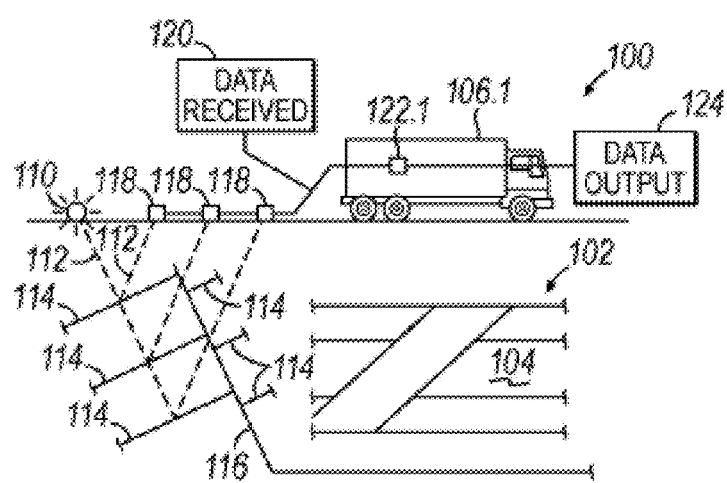
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
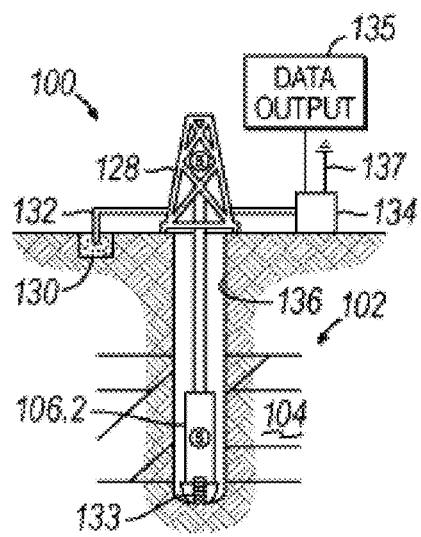

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
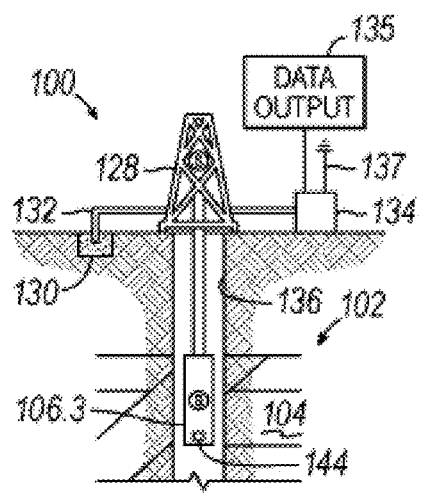

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
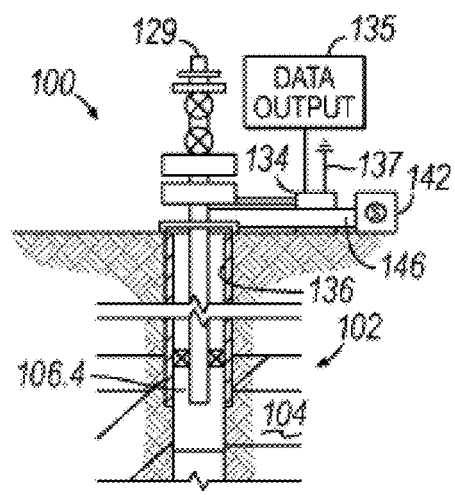

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
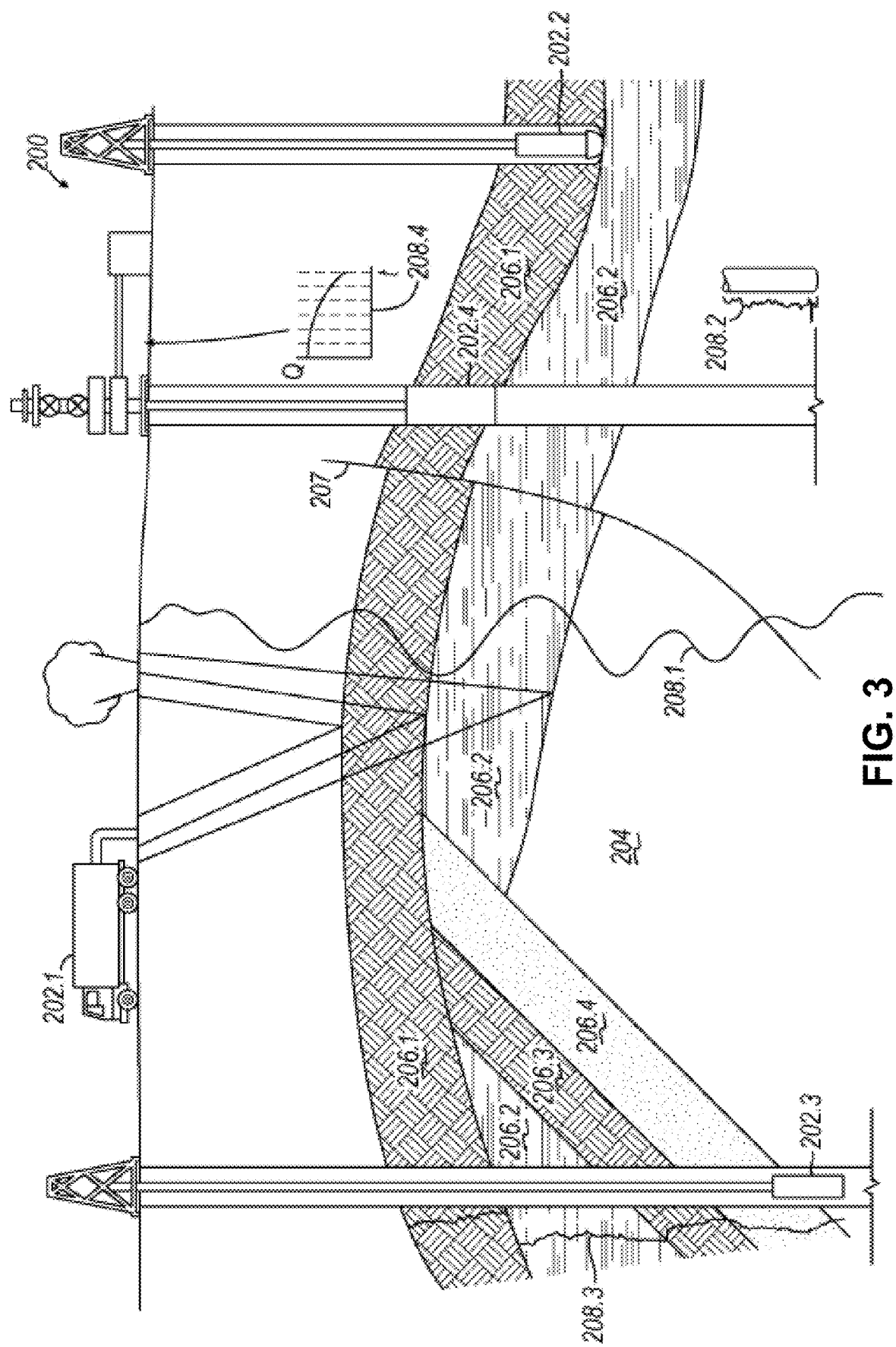
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
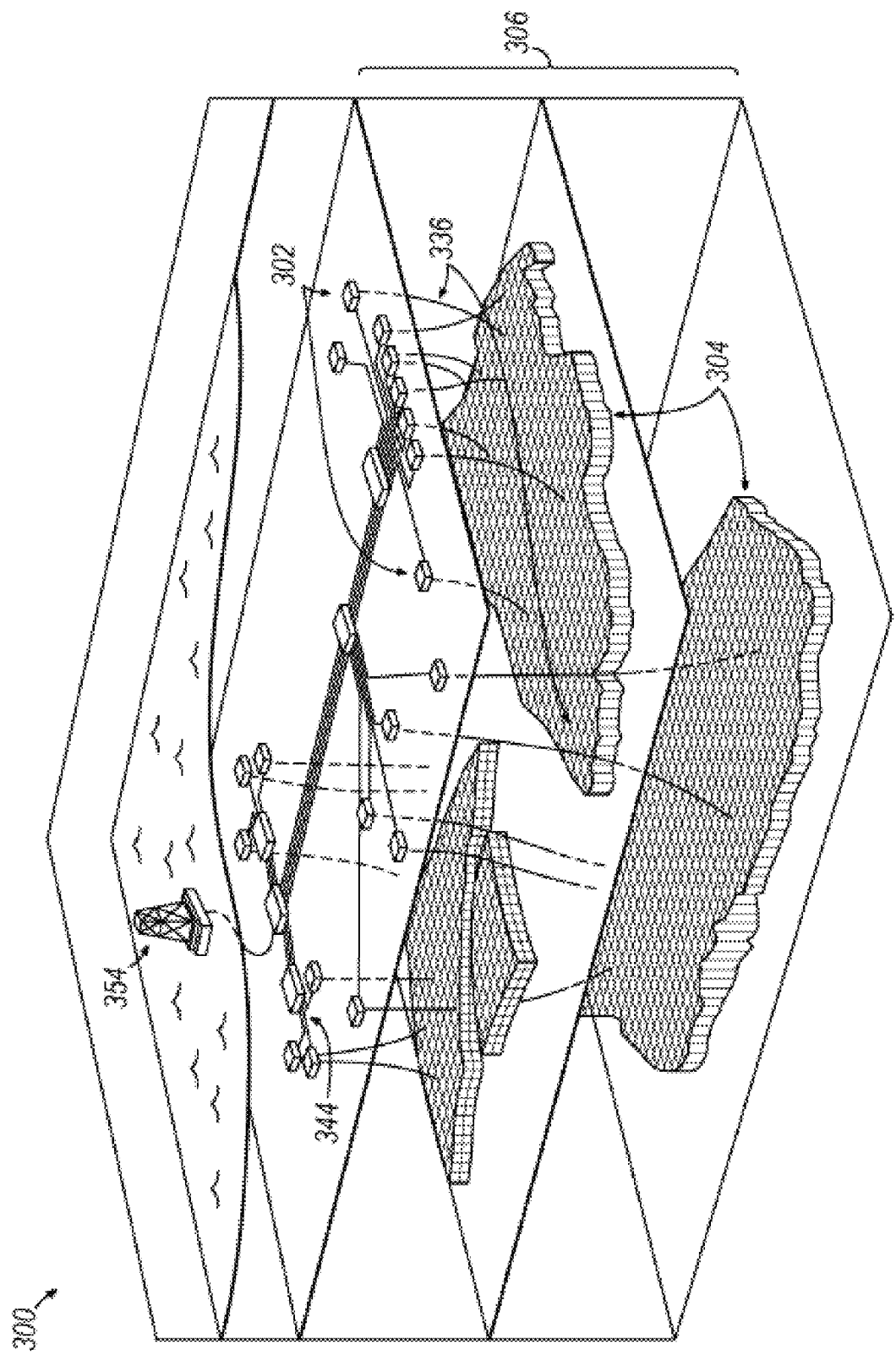
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Multi-Step Subsidence Inversion for Modeling Lithospheric Layer Thickness Through Geological Time As noted above, conventional modeling approaches for modeling the evolution of rift basins have been found to be limited, at least in part because these approaches have been found to insufficiently account for the different rheology and processes in the crust and upper mantle lithospheric layers. The upper mantle is generally semi-ductile, and thus less brittle than the crust, and is generally stretched over a wider area than the crust and generally without brittle failure during formation of a rift basin. Stretching in the more brittle crust, in contrast, is generally focused along faults. As will become more apparent below, embodiments consistent with the invention may model the evolution of lithospheric layer thickness through geological time in a manner that takes the individual behaviors of the crust and the mantle into consideration, and thereby provides greater accuracy in modeling than conventional approaches.

Figure 5:
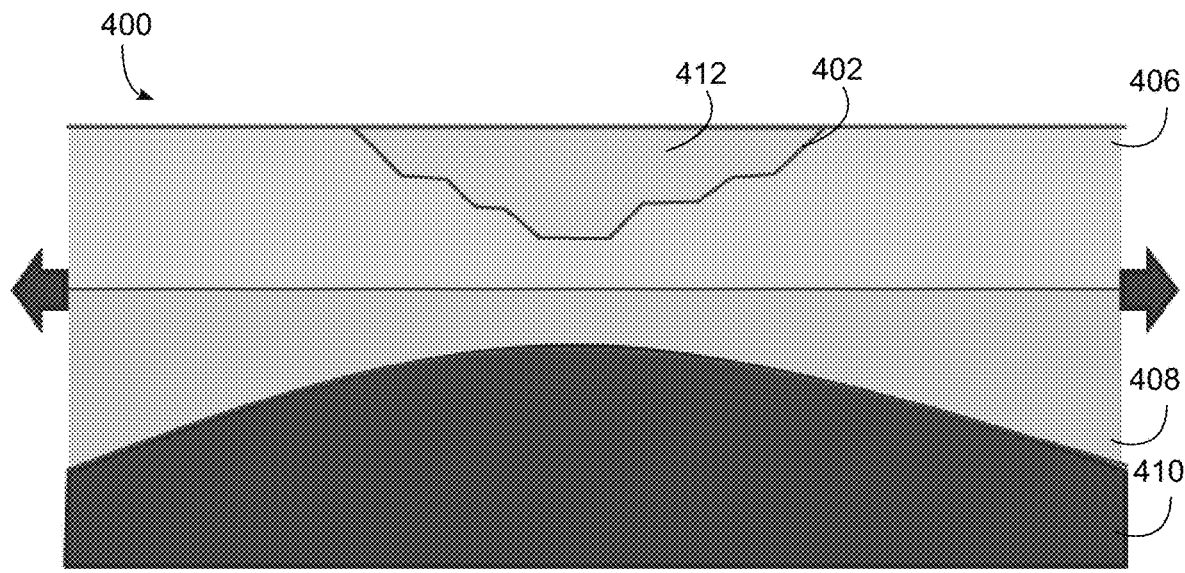
FIGS. 5 and 6 respectively illustrate syn-rift and post-rift phases of rift basin evolution.
Figure 6:
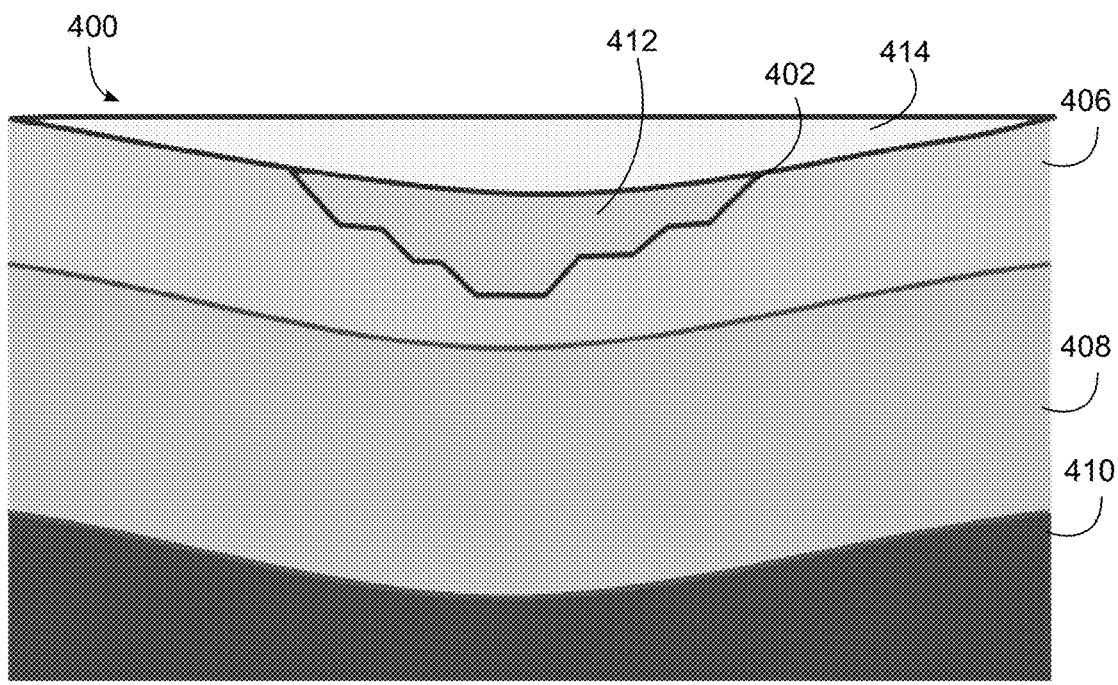

FIGS. 5 and 6, for example, illustrate the general evolution of a rift basin through geological time. Rift basin evolution generally involves two subsidence phases, syn-rift and post-rift, which are each recorded by deposited sediments, and which are controlled in part by thickness variations the crust and upper mantle lithospheric layers.

FIG. 5, in particular, illustrates a subsurface formation 400 including the rigid lithospheric layers (crust 406 and upper mantle 408) and the partially molten asthenosphere 410, which is generally considered to transition to the upper mantle 408 at about 1330 degrees Celsius. During a syn-rift phase, as illustrated in FIG. 5, the subsurface formation 400 is undergoing active lithospheric extension, resulting in the crust 406 and upper mantle 408 also undergoing thinning as a result of the stretching, and causing the formation of a rift basin 402 recorded by the deposition of syn-rift sediments 412.

Then, during a post-rift phase, as illustrated in FIG. 6, lithospheric extension halts and cooling occurs, resulting in thickening of the upper mantle 408 that is recorded by further deposition of post-rift sediments 414.

Figure 7:
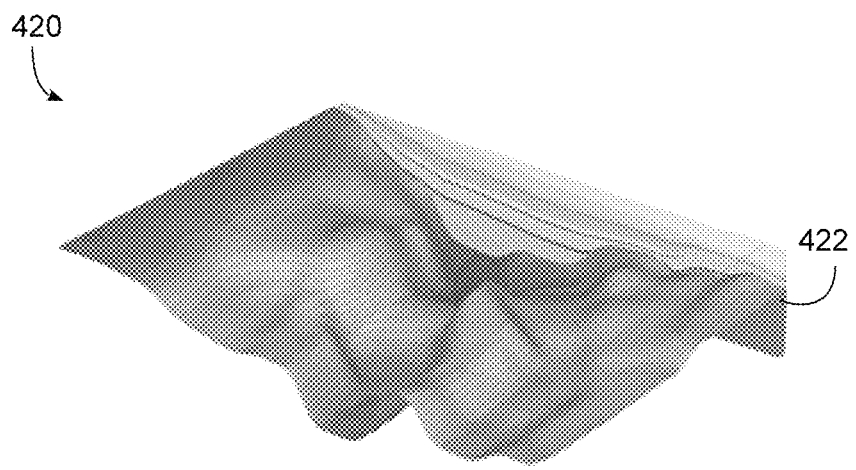
FIG. 7 illustrates a three-dimensional representation of an example rift basin.
Figure 8:
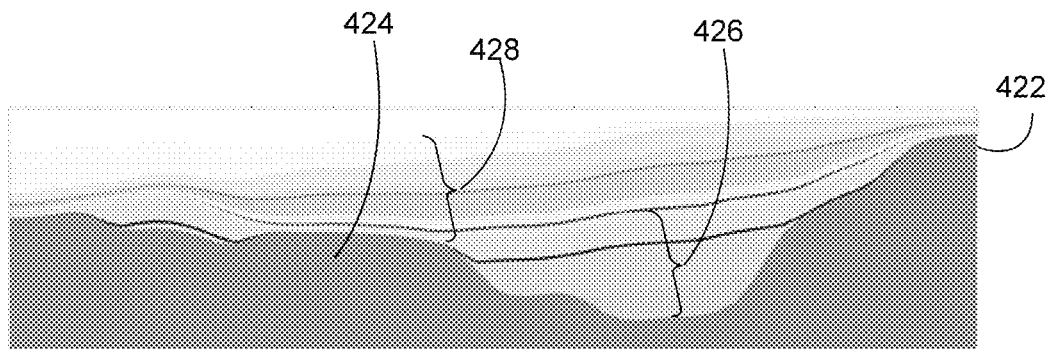
FIG. 8 illustrates a cross-section of the example rift basin of FIG. 7.

By way of further example, FIGS. 7 and 8 illustrate another example rift basin geometry with syn-rift and post-rift sequences. FIG. 7 illustrates a three-dimensional representation of a rift basin 420, and FIG. 8 illustrates a section 422 taken through the rift basin 420. FIG. 8 further illustrates syn-rift and post-rift sediments 426, 428. It should further be noted that there is no or very condensed syn-rift sediment in some areas of the rift basin, e.g., proximate horst 424.

Conventional approaches to modeling the evolution of lithospheric layer thickness apply a single-step subsidence inversion that fits stretching factors of the crust and the upper mantel simultaneously to a tectonic subsidence curve. With this approach, a mathematical "best fit" of the tectonic subsidence curve is obtained, without assuming any geological constraints for crustal and upper mantle stretching. It has been found, however, that this approach can lead to "un-geological" fits, such that a high upper mantle stretching factor is obtained in areas where only an average amount of post-rift sediments were deposited. It has been found, in particular, that a problem may exist in particular in depth-dependent stretching models where there is different thinning of the crust and upper mantle lithospheric layers.

Figure 9:
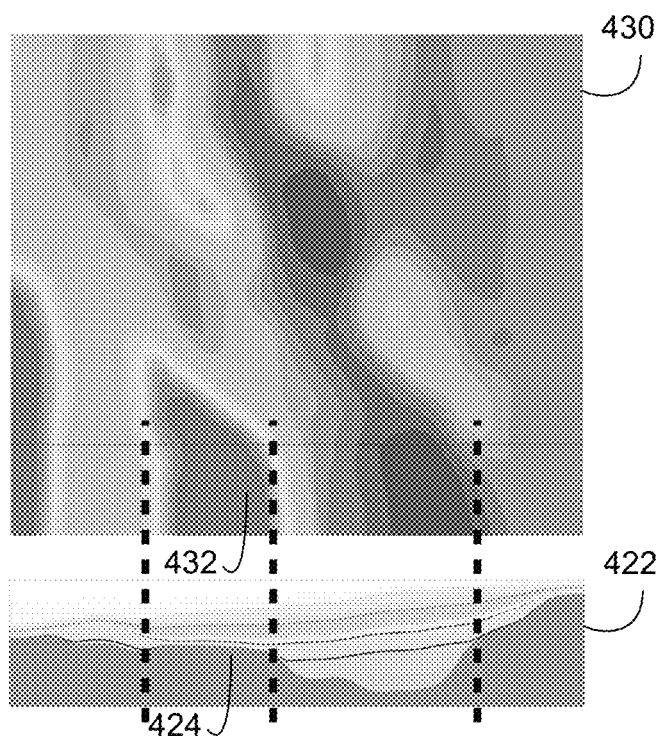
FIG. 9 illustrates an example stretching factor map generated for the rift basin of FIG. 7 using single-step subsidence inversion.

It should be noted that the distribution of stretching in crust and mantle is not necessarily equally distributed and that there may also be areas with no crustal stretching while the mantle is stretched. The overall stretching, however, is generally the same (i.e., areas below stretching curves are equal) between crust and mantle. In addition, if the mantle is stretched without the crust above, an isostatic uplift will generally result. It will also be appreciated that the absence of syn-rift sediments at some areas of a rift basin (e.g., proximate the location of horst 424 in FIG. 8) may cause problems with conventional inversion approaches, as these approaches may treat these areas the same way as the basin margins, which is geologically unreasonable. The result may be greater mantle stretching then required to explain the post-rift subsidence, e.g., as exemplified by FIG. 9, which illustrates a stretching factor map 430 that is correlated with section 422 of rift basin 420 and that includes unreasonably high values 432 above horst 424. Conventional approaches generally do not account for faulting, which is a focus of stretching in brittle layers such as the crust, and the very small thickness variations in the post-rift between the area of horst 424 and the area of the graben (deepest parts in segment 422) indicate that the stretching in the mantle was roughly the same for the area of the horst and of the graben.

In part to address these shortcomings of conventional approaches, embodiments consistent with the invention may incorporate a multi-step subsidence inversion in order to separate the subsidence curve into syn-rift subsidence and post-rift subsidence curves, and to fit the upper mantle stretching to the post-rift subsidence curve and the crustal stretching to the syn-rift subsidence curve. In some embodiments, therefore, one parameter, e.g., a stretching factor, may be fit to the part of the curve that is most strongly influenced by this parameter, rather than attempting to fit two parameters to the full curve at once.

In some embodiments, for example, syn-rift and post-rift subsidence of a rift basin may be inverted to stretching factors/lithospheric thicknesses taking the individual behaviors of both the crust and upper mantle lithospheric layers into account. In a first inversion step in such embodiments, post-rift subsidence may be inverted to define the thermal thickening of the upper mantle during this phase. Doing so may enable the lithospheric upper mantle thickness or the upper mantle stretching to be defined at the end of the syn-rift phase, and with this information, the syn-rift subsidence may be inverted for the crustal stretching or crustal thicknesses at the end of the syn-rift phase.

As such, in some embodiments consistent with the invention, deconvolution may effectively be achieved between the subsidence phases and the stretching amounts in the lithospheric layers. As post-rift subsidence is generally related to the cooling of the lithospheric mantle only, post-rift subsidence generally starts when maximum mantle stretching has occurred, and as such, inverting the post-rift subsidence only for mantle stretching is believed to deliver greater accuracy for modeling the stretching of the upper mantle, and further, by knowing the stretching in the upper mantle, inversion of the syn-rift subsidence together with the previously-calculated upper mantle stretching information to model the crustal stretching is simplified and results in more accurate results.

Figure 10:
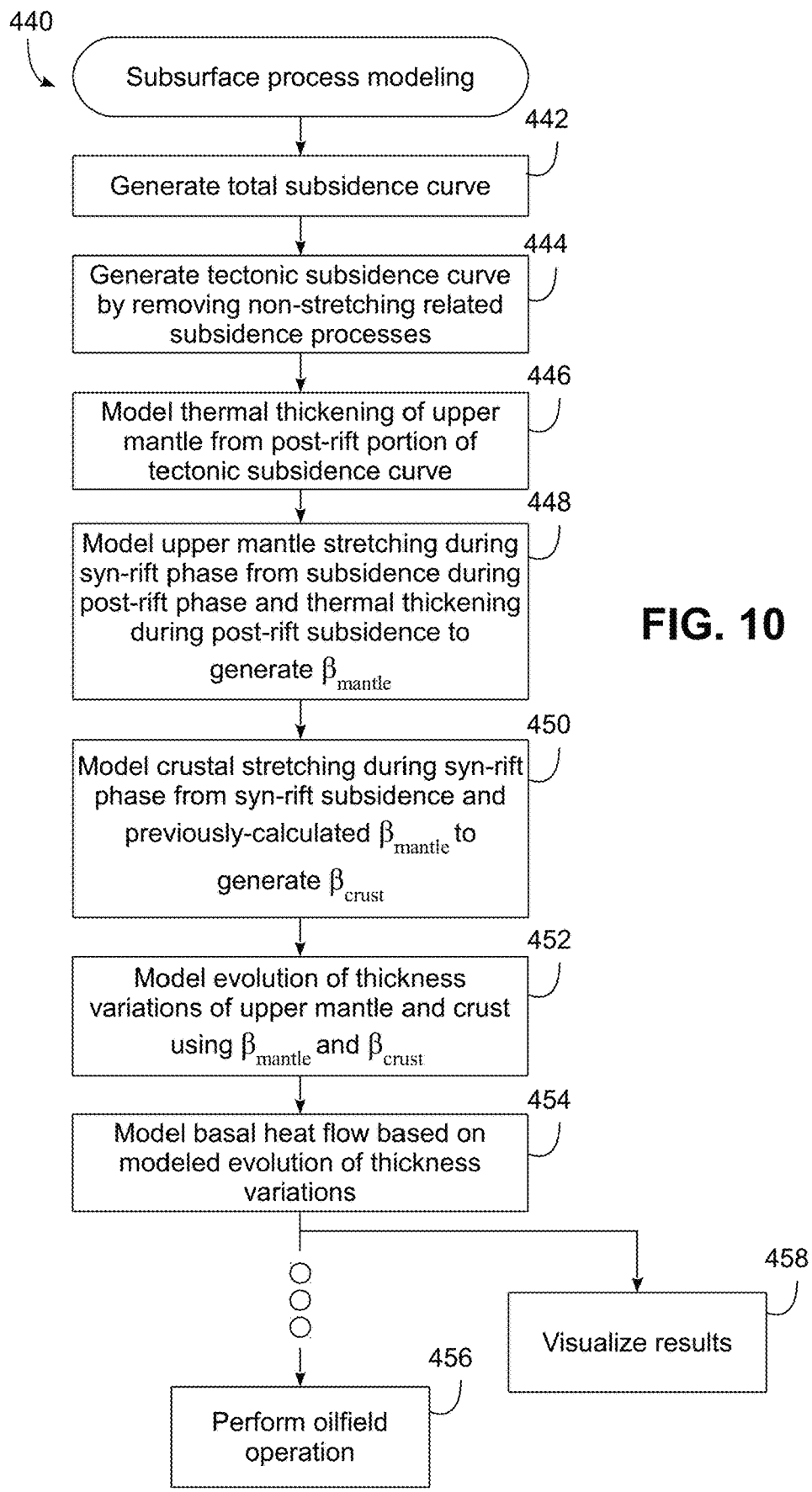
FIG. 10 is a flowchart illustrating an example sequence of operations suitable for implementation in the data processing system of FIG. 1 to perform subsurface process modeling in a manner consistent with the invention.

FIG. 10, for example, illustrates an example sequence of operations 440 that may be performed in data processing system 10 of FIG. 1 to perform subsurface process modeling incorporating the herein-described multi-step subsidence inversion consistent with some embodiments of the invention, e.g., as implemented within one or more petro-technical modules or components 32 thereof. It will be appreciated that the functionality implemented within sequence of operations 440 may be implemented in some embodiments using automated operations from start to finish, while in other embodiments, user input may be used to transition between different operations, provide additional input data, and/or initiate certain operations such as running one tool or component upon completion of another tool or component. Additional user-performed operations may also be performed in connection with the operations performed by sequence of operations 440. Further, in some embodiments, a workflow may be implemented to guide a user between different operations. The performance of certain operations in response to user input, however, does not detract from the fact that it is computer-implemented functionality that implements the herein-described operations.

The herein-described multi-step subsidence inversion technique may utilize a subsidence curve that describes subsidence during both syn-rift and post-rift phases of the evolution of a rift basin. As such, in some embodiments, blocks 442 and 444 may be used to generate a "tectonic" subsidence curve that describes the subsidence through geological time that is based on stretching-related subsidence. First, in block 442, a total subsidence curve may be generated to describe the total subsidence of a rift basin resulting from all factors. Input to block 442 may include, for example, current formation data such as depth to basement, sediment fill, sediment compaction, etc. The input may also include additional paleo-geometric data such as water depth, uplift and erosion, salt movement, etc., as well as stratigraphic data such as age interpretations of syn-rift and post-rift sequences, timing of uplift and erosion, etc. It will be appreciated that generation of a total subsidence curve using various approaches is within the abilities of those of ordinary skill in the art having the benefit of the instant disclosure.

Next, in block 444, a tectonic subsidence curve is generated from the total subsidence curve by removing non-stretching effects from the total subsidence curve, e.g., by performing a back-stripping operation of the basin fill to address the loading induced subsidence effects. Various other operations suitable for removing non-stretching effects may also be used, and will be apparent to those of ordinary skill in the art having the benefit of the instant disclosure.

Blocks 446-450 next implement one example embodiment of the herein-described multi-step subsidence inversion technique, generally by modeling thermal thickening of the upper mantle lithospheric layer during the post-rift subsidence and based upon the post-rift portion of the tectonic subsidence curve (block 446), modeling upper mantle stretching during the syn-rift phase based upon subsidence during the post-rift phase and thermal thickening of the upper mantle lithospheric layer during the post-rift subsidence (block 448), and modeling crustal stretching during the syn-rift phase from syn-rift subsidence and the modeled upper mantle stretching from block 448 (block 450). Blocks 448 and 450 respectively generate upper mantle and crust stretching factors denoted as $\beta_{mantle}$ and $\beta_{crust}$, which in some embodiments may be implemented as stretching factor maps, as will be apparent to those of ordinary skill in the art having the benefits of the instant disclosure. Furthermore, it will be appreciated that in some embodiments, various modeling operations may be performed in parallel and/or performed as sub-operations of other modeling operations, e.g., block 446 may be considered to be performed within block 448 in some embodiments.

In some embodiments, modeling of the thermal thickening in block 446, modeling of the upper mantle stretching in block 448 and/or modeling of the crustal stretching in block 450 includes a subsidence inversion. Furthermore, in some embodiments, modeling of the thermal thickening in block 446, modeling of the upper mantle stretching in block 448 and/or modeling of the crustal stretching in block 450 may be performed in part via curve fitting, e.g., by fitting a post-rift subsidence curve by varying the upper mantle stretching factor, and by fitting a syn-rift subsidence curve by varying the crust stretching factor and using a previously-calculated upper mantle stretching factor. Implementation of such modeling and/or curve-fitting functionality will be readily apparent to those of ordinary skill in the art having the benefit of the instant disclosure.

The results of multi-step subsidence inversion may be used in a number of manners in different embodiments. For example, as illustrated in block 452, the results may be used to model the evolution of thickness variations of the upper mantle and crust through geological time, and as illustrated in block 454, the results of block 452 may be used to further model basal heat flow. Further, as illustrated in block 456, the results of any of blocks 450-454 may be used to perform one or more oilfield operations, while as illustrated in block 458, any of the results may be visualized on a computer display, e.g., for further analysis. Oilfield operations in the illustrated embodiments may include a wide variety of planning and/or physical activities, e.g., developing exploration well plans or field development plans, forecasting production, resource assessment, prioritizing investments, etc. It will be appreciated, however, that results of multi-step subsidence inversion may be used for other purposes, and as such, each of blocks 452-458 may be omitted in other embodiments. Further, the herein-described techniques may be used in various applications, including, but not limited to petroleum system modeling, advanced pressure prediction, or any other application benefiting from an understanding of the temperature history of a sedimentary basin (e.g., cementation, mineral transformations, etc.)

Figure 11:
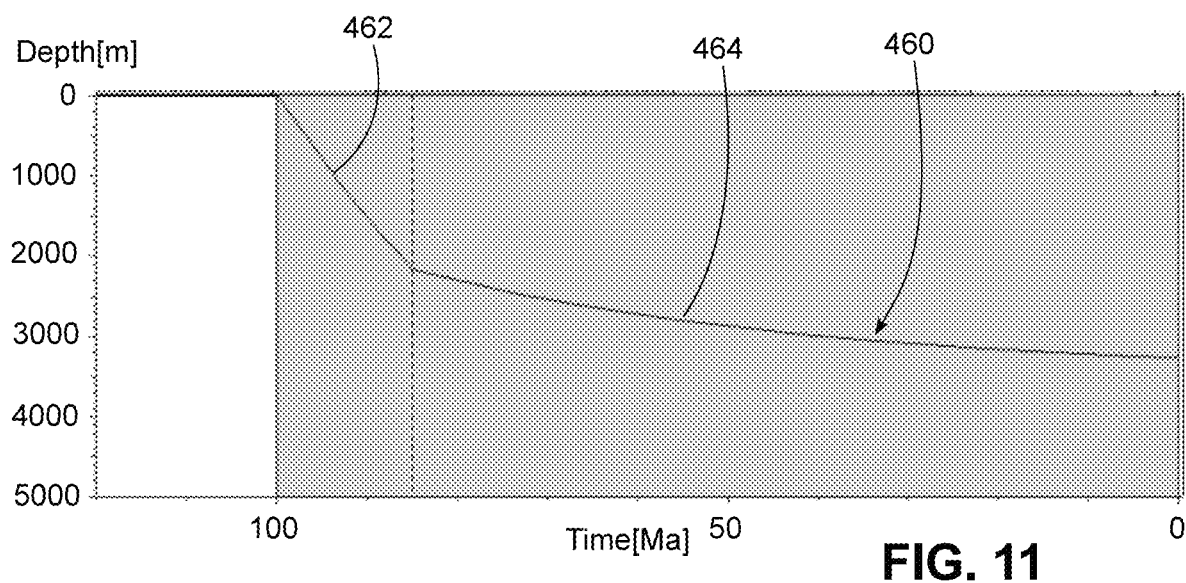
FIG. 11 illustrates an example tectonic subsidence curve.
Figure 12:
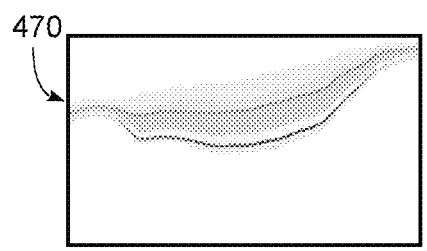
FIGS. 12 and 13 respectively illustrate the generation of upper mantle and crust stretch factors using the sequence of operations of FIG. 10 for the example rift basin of FIG. 7.
Figure 12:
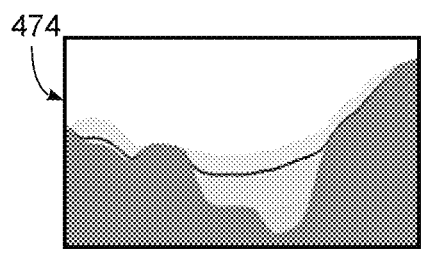
Figure 12:
Figure 13:

Next, with reference to FIGS. 11-13, the herein-described multi-step inversion technique is further illustrated by way of example. FIG. 11, in particular, illustrates an example tectonic subsidence curve 460 including syn-rift and post-rift portions 462, 464. FIG. 12 illustrates an inversion performed of post-rift subsidence 470 to generate an upper mantle stretching factor represented by curve 472. As noted above, since post-rift subsidence is created principally as a result of density increase during cooling within the lithospheric or upper mantle, the inversion in this step is principally inverted to define thermal thickening of the mantle during the post-rift phase. Next, as depicted in FIG. 13, the upper mantle stretching factor information that is generated as a result of the prior inversion is used to invert the syn-rift subsidence 474 to the crustal stretching factor represented by curve 476. The upper mantle information is used in this second inversion generally because the thickness evolution during the syn-rift phase influences the overall subsidence during the syn-rift phase.

Figure 14:
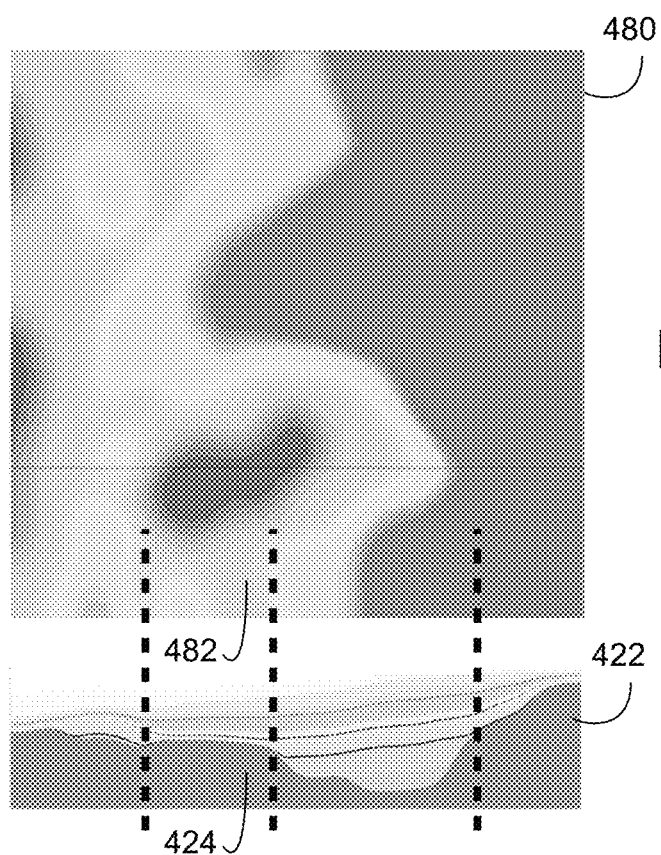
FIG. 14 illustrates an example stretching factor map generated for the rift basin of FIG. 7 using the sequence of operations of FIG. 10.

This multi-step approach to modeling is believed to result in a more accurate stretching factor maps for both the lithospheric mantle and crust. For example, FIG. 14 illustrates a stretching factor map 480 corresponding to stretching factor map 430 of FIG. 9, but generated using the herein-described multi-step approach, and illustrating values in the region 482 corresponding to horst 424 that are more geologically realistic than provided by conventional approaches.

Figure 15:
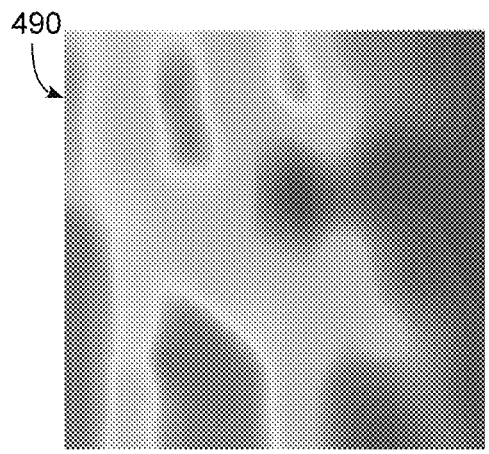
FIGS. 15 and 16 respectively illustrate heat flow maps generated for the rift basin of FIG. 7 using single-step subsidence inversion and using the sequence of operations of FIG. 10.
Figure 16:
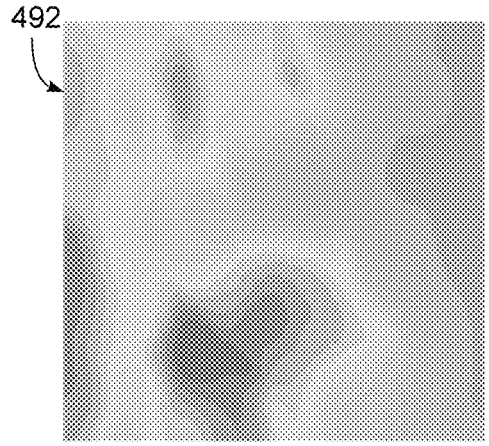

Moreover, through generating more accurate stretching factor maps, more accurate modeling of thickness variations and/or basal heat flow may be obtained. FIGS. 15 and 16, for example, illustrate corresponding heat flow maps 490, 492 generated respectively by a conventional single-step approach and the herein-described multi-step approach, where it will be appreciated that the multi-step approach provides more geologically-realistic results.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of modeling a subsurface process for a rift basin in a subsurface formation, the subsurface process including a syn-rift phase followed by a post-rift phase, the method comprising:
   generating a tectonic subsidence curve for the rift basin, the tectonic subsidence curve including a syn-rift portion for the syn-rift phase and a post-rift portion for the post-rift phase;
   modeling upper mantle stretching for the rift basin during the syn-rift phase using at least one processing unit and based upon the post-rift portion of the generated tectonic subsidence curve and thermal thickening of the upper mantle lithospheric layer of the subsurface formation during post-rift subsidence, wherein modeling the upper mantle stretching includes fitting upper mantle stretching to the post-rift portion of the generated tectonic subsidence curve for the rift basin; and
   modeling crustal stretching for the rift basin during the syn-rift phase using the at least one processing unit based upon the syn-rift portion of the generated tectonic subsidence curve and the modeled upper mantle stretching, wherein modeling the crustal stretching includes fitting crustal stretching to the syn-rift portion of the generated tectonic subsidence curve for the rift basin and using a previously generated upper mantle stretching factor.

2. The method of claim 1, further comprising modeling the thermal thickening of the upper mantle lithospheric layer of the subsurface formation during the post-rift subsidence.

3. The method of claim 1, further comprising modeling an evolution of thickness variations of the upper mantle and crust lithospheric layers through geological time based at least in part upon the modeled upper mantle stretching and modeled crustal stretching for the rift basin.

4. The method of claim 3, further comprising modeling basal heat flow in the subsurface formation through geological time based upon the modeled evolution of thickness variations.

5. The method of claim 4, further comprising performing an oilfield operation based upon the modeled evolution of thickness variations and/or the modeled basal heat flow in the subsurface formation.

6. The method of claim 4, further comprising causing a graphical depiction of the modeled evolution of thickness variations and/or the modeled basal heat flow to be displayed on a computer display.

7. The method of claim 1, wherein modeling the upper mantle stretching includes generating an upper mantle stretching factor, and wherein modeling the crustal stretching includes generating a crust stretching factor.

8. The method of claim 7, wherein the upper mantle stretching factor includes an upper mantle stretching factor map, and the crust stretching factor includes a crust stretching factor map.

9. The method of claim 7, wherein modeling the crustal stretching includes modeling the crustal stretching using the generated upper mantle stretching factor.

10. The method of claim 9, wherein modeling the upper mantle stretching includes inverting post-rift subsidence, and wherein modeling the crustal stretching includes inverting syn-rift subsidence.

11. The method of claim 9, wherein fitting the upper mantle stretching to the post-rift portion of the generated subsidence curve for the rift basin includes fitting the post-rift portion of the generated subsidence curve for the rift basin by varying the upper mantle stretching factor, and wherein fitting the crustal stretching to the syn-rift portion of the generated subsidence curve for the rift basin includes fitting the syn-rift portion of the generated subsidence curve for the rift basin by varying the crust stretching factor and using the generated upper mantle stretching factor.

12. The method of claim 1, wherein generating the tectonic subsidence curve includes removing non-stretching effects from a total subsidence curve for the rift basin.

13. The method of claim 12, further comprising generating the total subsidence curve for the rift basin based at least in part on sediment fill, current formation data, paleogeometric data and stratigraphic data.

14. The method of claim 1, further comprising causing a graphical depiction of the tectonic subsidence curve to be displayed on a computer display.

15. The method of claim 1, further comprising performing a physical oilfield operation based upon the modeled upper mantle stretching and modeled crustal stretching.

16. An apparatus, comprising:
at least one processing unit; and
program code configured upon execution by the at least one processing unit to model a subsurface process for a rift basin in a subsurface formation, wherein the subsurface process includes a syn-rift phase followed by a post-rift phase, and wherein the program code is configured to model the subsurface process by:
generating a tectonic subsidence curve for the rift basin, the tectonic subsidence curve including a syn-rift portion for the syn-rift phase and a post-rift portion for the post-rift phase;
modeling upper mantle stretching for the rift basin during the syn-rift phase and based upon the post-rift portion of the generated tectonic subsidence curve and thermal thickening of the upper mantle lithospheric layer of the subsurface formation during post-rift subsidence; and
modeling crustal stretching for the rift basin during the syn-rift phase based upon the syn-rift portion of the generated tectonic subsidence curve and the modeled upper mantle stretching, wherein modeling the upper mantle stretching includes fitting upper mantle stretching to the post-rift portion of the generated tectonic subsidence curve for the rift basin, and wherein modeling the crustal stretching includes fitting crustal stretching to the syn-rift portion of the generated tectonic subsidence curve for the rift basin and using a previously generated upper mantle stretching factor.

17. A program product, comprising:
a non-transitory computer readable medium; and
program code stored on the computer readable medium and configured upon execution by at least one processing unit to model a subsurface process for a rift basin in a subsurface formation, wherein the subsurface process includes a syn-rift phase followed by a post-rift phase, and wherein the program code is configured to model the subsurface process by:
generating a tectonic subsidence curve for the rift basin, the tectonic subsidence curve including a syn-rift portion for the syn-rift phase and a post-rift portion for the post-rift phase;
modeling upper mantle stretching for the rift basin during the syn-rift phase and based upon the post-rift portion of the generated tectonic subsidence curve and thermal thickening of the upper mantle lithospheric layer of the subsurface formation during post-rift subsidence; and
modeling crustal stretching for the rift basin during the syn-rift phase based upon the syn-rift portion of the generated tectonic subsidence curve and the modeled upper mantle stretching, wherein modeling the upper mantle stretching includes fitting upper mantle stretching to the post-rift portion of the generated tectonic subsidence curve for the rift basin, and wherein modeling the crustal stretching includes fitting crustal stretching to the syn-rift portion of the generated tectonic subsidence curve for the rift basin and using a previously generated upper mantle stretching factor.

* * * * *